(12) United States Patent
Heidari et al.

(10) Patent No.: US 9,602,973 B2
(45) Date of Patent: Mar. 21, 2017

(54) APPLYING ERROR RESILIENCY BASED ON SPEED

(71) Applicant: Qualcomm Incorporated, San Diego, CA (US)

(72) Inventors: Alireza Ryan Heidari, Encinitas, CA (US); Daniel J. Sinder, San Diego, CA (US); Zheng Fang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 13/770,687

(22) Filed: Feb. 19, 2013

(65) Prior Publication Data

US 2014/0233404 A1 Aug. 21, 2014

(51) Int. Cl.
*H04W 4/02* (2009.01)
*H04L 1/00* (2006.01)

(52) U.S. Cl.
CPC ........... *H04W 4/027* (2013.01); *H04L 1/0009* (2013.01)

(58) Field of Classification Search
CPC ..... H04L 1/0041; H04L 1/0045; H04L 1/008; H04W 4/027
See application file for complete search history.

(56) References Cited

U.S. PATENT DOCUMENTS

| | | | |
|---|---|---|---|
| 7,088,683 B2 | 8/2006 | Sawada et al. | |
| 7,313,087 B2 * | 12/2007 | Patil et al. | 370/217 |
| 7,653,347 B2 | 1/2010 | Klotsche et al. | |
| 7,753,756 B2 | 7/2010 | McDermott et al. | |
| 7,840,220 B1 | 11/2010 | Mitchell | |
| 8,050,289 B1 * | 11/2011 | Masterson | H04N 21/2343 370/465 |
| 8,335,970 B2 * | 12/2012 | Seshadri et al. | 714/776 |
| 8,582,516 B2 * | 11/2013 | Chen | H04B 7/02 370/329 |
| 8,582,644 B2 * | 11/2013 | Lu et al. | 375/240.02 |
| 8,787,153 B2 * | 7/2014 | Begen et al. | 370/225 |
| 2006/0205406 A1 | 9/2006 | Pekonen et al. | |

FOREIGN PATENT DOCUMENTS

| | | |
|---|---|---|
| EP | 2037694 A1 | 3/2009 |
| EP | 2109339 A1 | 10/2009 |
| WO | WO-2005103755 A1 | 11/2005 |

OTHER PUBLICATIONS

International Search Report and Written Opinion—PCT/US2014/015960—ISA/EPO—Apr. 22, 2014.

(Continued)

*Primary Examiner* — Ayaz Sheikh
*Assistant Examiner* — Debebe Asefa
(74) *Attorney, Agent, or Firm* — Austin Rapp & Hardman

(57) ABSTRACT

A method for applying error resiliency based on speed is disclosed. A speed of the wireless communication device is detected. Source-based error resiliency is dynamically applied to a signal based on the speed. The signal is sent on an uplink. In addition to the speed, the source-based error resiliency may be dynamically applied to the signal based on a characteristic of the signal.

31 Claims, 9 Drawing Sheets

(56) References Cited

OTHER PUBLICATIONS

Wiegand, T., et al., "Error-Resilient Video Transmission Using Long-Term Memory Motion—Compensated Prediction", IEEE Journal on Selected Areas in Communications, IEEE Service Center, Piscataway, US, vol. 18, No. 6, Jun. 1, 2000 (Jun. 1, 2000) XP011055153, pp. 1050-1062, ISSN: 0733-8716, see p. 1055, chapter "A. Channel Model and Modulation"; see p. 1056, right-hand column.

Zhou, X., et al., "Adaptive and Integrated Video Communications for Wireless ATM in WCDMA Systems", Connecting the Mobile World : Proceedings / IEEE VTS 53rd Vehicular Technology Conference, Spring, 2001; [IEEE Vehicular Technology Copnference], IEEE Service Center, USA, vol. Conf. 53, May 6, 2001 (May 6, 2001), pp. 2147-2151, XP001082523, DOI:10.1109/VETECS. 2001.945076 ISBN: 978-0-7803-6728-9, see Abstrat & Introduction; see chapter "B. Fading Channel". see chapter "111.Source Coding" see p. 2151, left-hand column.

* cited by examiner

FIG. 6

| Speed Lookup Table 628 | |
|---|---|
| Speed 638 | Amount of Error Resiliency 642 |
| 0 mph | 0 |
| 10 mph | A |
| 20 mph | B |
| 30 mph | C |
| 40 mph | D |
| 50 mph | E |
| 60 mph | E |
| 70 mph | E |

| | 10 mph | 30 mph | 50 mph |
|---|---|---|---|
| X | A | B | C |
| Y | D | E | F |
| Z | G | H | I |

Speed 738

Signal Characteristic 746

APPLYING ERROR RESILIENCY BASED ON SPEED

TECHNICAL FIELD

The present disclosure relates generally to electronic devices. More specifically, the present disclosure relates to applying error resiliency based on speed.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society.

In various situations, it may be desirable for electronic devices to communicate with each other. Communication between electronic devices may be beneficial. For example, communication between electronic devices may allow one electronic device to utilize the functionality of another electronic device. In many cases, a communications interface may be used for communication between one or more electronic devices.

The quality of the communications between two or more electronic devices depends on the ability of the two or more electronic devices to communicate over the communications interface. As can be observed from this discussion, systems and methods for applying error resiliency based on speed may be beneficial.

SUMMARY

A method for applying error resiliency based on speed is disclosed. A speed of a wireless communication device is detected. Source-based error resiliency is dynamically applied to a signal based on the speed. The signal is sent on an uplink.

In one configuration, source-based error resiliency may be dynamically applied to the signal based on the speed and a characteristic of the signal. The signal may be a source signal and may include a data packet, a speech signal, a music signal, a video signal or some combination. The signal may be sent using a packet switched network and a voice over packet switched protocol. The speed may be detected based on accelerometer data, Global Positioning System (GPS) data, or some combination.

Applying source-based error resiliency may including using frame repetition, block coding, convolutional coding, low-density parity check (LDPC) coding, turbo coding, Reed-Solomon coding, Golay coding, BCH coding, multi-dimensional parity check coding, Hamming coding and Cyclic Redundancy Check (CRC) coding, or some combination.

A wireless communication device for applying error resiliency based on speed is also disclosed. The wireless communication device includes a processor and memory in electronic communication with the processor. Executable instructions are stored in the memory. The instructions are executable to detect a speed of the wireless communication device. The instructions are also executable to apply source-based error resiliency dynamically to a signal based on the speed. The instructions are also executable to send the signal on an uplink.

A wireless communication device for applying error resiliency based on speed is also disclosed. The wireless communication device includes means for detecting a speed of the wireless communication device. The wireless communication device also includes means for applying source-based error resiliency dynamically to a signal based on the speed. The wireless communication device also includes means for sending the signal on an uplink.

A computer-program product for applying error resiliency based on speed is also disclosed. The computer-program product includes a computer-readable medium having instructions thereon. The instructions include code for causing a wireless communication device to detect a speed of the wireless communication device. The instructions also include code for causing the wireless communication device to apply source-based error resiliency dynamically to a signal based on the speed. The instructions also include code for causing the wireless communication device to send the signal on an uplink

BRIEF DESCRIPTION OF THE DRAWINGS

FIG. 6 is a diagram illustrating a speed lookup table;

FIG. 7 is a block diagram illustrating a combined lookup table;

DETAILED DESCRIPTION

When a device is transmitting voice or data wirelessly over packet switched networks, packet losses may occur and make it difficult to maintain a desired level of quality, especially during periods of motion, e.g., while driving in a car. For example, voice over Long Term Evolution (VoLTE) with the Internet Protocol (IP) multimedia subsystem (IMS) and quality of service (QoS) may not be sufficient to provide transparent circuit switched (CS) voice services. A non-optimized Long Term Evolution (LTE) network may not provide full IP mobility for real-time voice services. Operators' field trials show extensive frame error rate (FER) due to poor IP mobility unsecured hard handoffs. These occurrences usually happen when driving over 10 miles per hour (MPH). In other words, packet losses become a larger problem as mobility increases, thus making it difficult to maintain data rates to ensure quality of service (QoS), e.g., to maintain consistent High Definition (HD) voice quality.

One possible solution is to send Forward Error Correction (FEC) bits, i.e., sending extra redundant bits in order to make the data more resilient to errors. Applying FEC or error resiliency may be performed by a channel coder, i.e., determining the extra bits to send based on an estimate of channel quality. For example, a wireless communication device may estimate a channel (e.g., using a signal-to-noise ratio or other channel feedback) and apply error resiliency based on the estimated channel. However, channel coding may be relatively slow because the error resiliency is only adjusted after the channel has already degraded.

Another possible solution is to plan on a worst-case scenario and always send maximum error resiliency bits. However, such non-dynamic error resiliency may waste bandwidth. Therefore, it may be beneficial to predict the occurrence of such incidents and only transmit resiliency bits (e.g., an increased number of resiliency bits) when really needed. The problem is that the erasures happen in the receiver side and the transmitter may not have a prior knowledge of it. Accordingly, in some configurations of the present systems and methods, a smartphone accelerometer and/or global positioning system (GPS) may be utilized to predict the speed of the smartphone (in a car, for example) and then report such connectivity to the firmware/vocoder and apply the encoded error resiliency bits while the smartphone (in a car, for example) is in motion. This is one secure and spectrally efficient method to maintain consistent voice quality at all times, e.g., when using voice over packet switched network protocols such as VoLTE and VoIP. With respect to other known solutions, the approach described herein may improve the overall system voice capacity. The present systems and methods may also be compatible with circuit switched networks.

Figure 1:
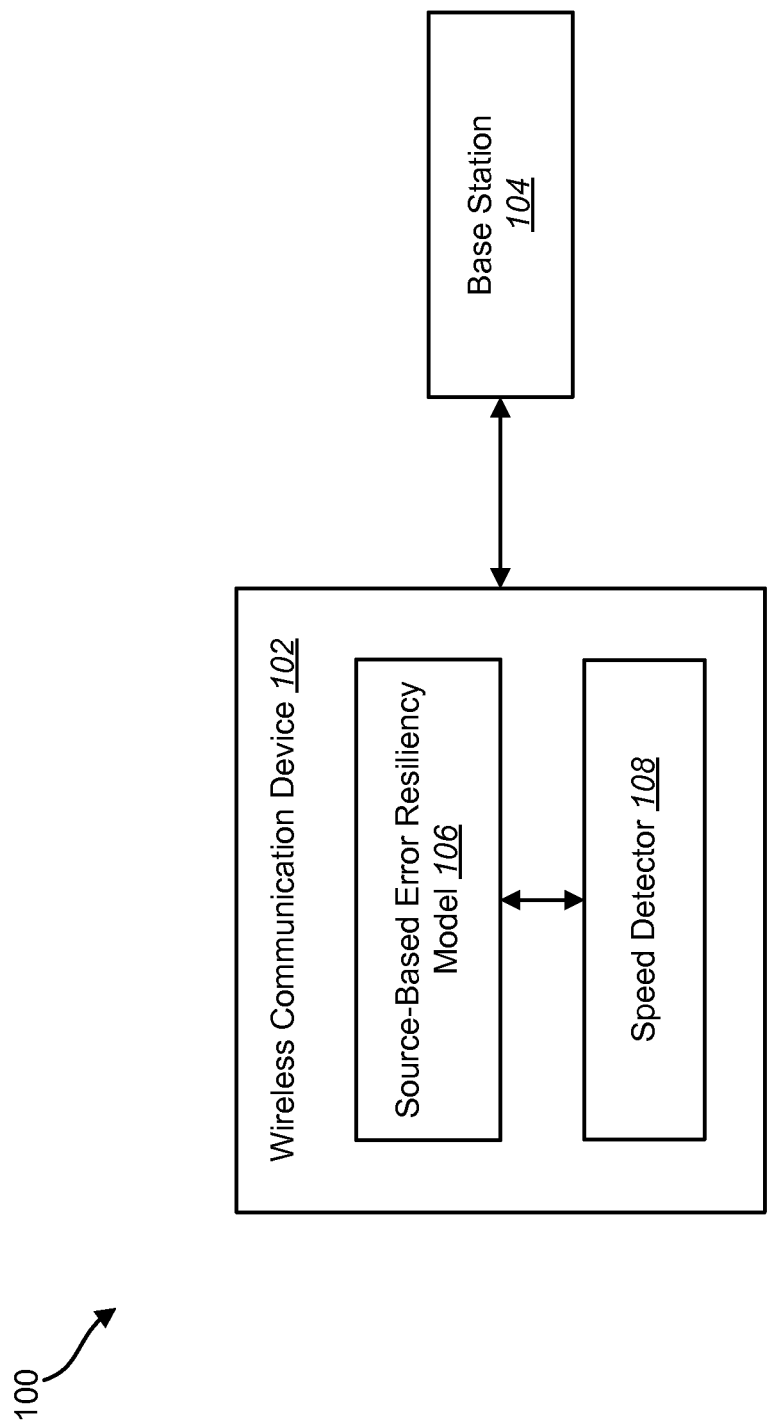
FIG. 1 is a block diagram illustrating a wireless communication system with a wireless communication device that communicates wirelessly with a base station.

FIG. 1 is a block diagram illustrating a wireless communication system 100 with a wireless communication device 102 that communicates wirelessly with a base station 104. Wireless communication devices 102 may be referred to as mobile devices, mobile stations, subscriber stations, clients, client stations, user equipment (UEs), remote stations, access terminals, mobile terminals, terminals, user terminals, subscriber units, etc. Examples of wireless communication devices 102 include wireless routers, laptop or desktop computers, cellular phones, smart phones, wireless modems, e-readers, tablet devices, gaming systems, etc. Base stations 104 may be referred to as access points, Node Bs, evolved Node Bs, etc.

The wireless communication device 102 may include a source-based error resiliency module 106 and a speed detector 108. The source-based error resiliency module 106 may dynamically apply source-based error resiliency to transmitted voice or data.

The terms "error resiliency" and "error protection" may be used interchangeably herein to refer to the addition of extra bits to transmitted data to make the transmission less susceptible to errors at the receiver. Examples of error resiliency include frame repetition, block coding, convolutional coding, low-density parity check (LDPC) coding, turbo coding, Reed-Solomon coding, Golay coding, BCH coding, multidimensional parity check coding, Hamming coding and Cyclic Redundancy Check (CRC) coding. As used herein, the term "source-based" error resiliency is used to distinguish it from channel coding, i.e., "source-based" refers to error resiliency that is performed as part of source coding as opposed to during channel coding.

Source coding involves encoding information using fewer bits than the original representation, while channel coding is used for controlling errors in data transmission over unreliable or noisy communication channels, e.g., by adding redundant data. In other words, the objective of source coding is to minimize the bit rate for representation of the source at the output of a source coder, subject to a constraint on fidelity. The objective of channel coding is to maximize the information rate that the channel can convey sufficiently reliably (where reliability may be measured as a bit error probability).

For example, source-based error resiliency may take place at a level higher than the physical layer (e.g., in the vocoder), while channel coding may take place on the physical layer. Furthermore, in one configuration, source-based error resiliency may be source-dependent while channel coding is dependent on a channel estimate, i.e., source-based error resiliency may be applied based on, among other factors, the importance or characteristics of the information being transmitted. For example, high energy or quasi/non-stationary voice segments may be given more error resiliency than low energy or stationary voice segments. Furthermore, the present systems and methods may be implemented without modifying relevant common air interface (CAI) standards.

The speed detector 108 may detect movement of the wireless communication device 102 relative to its surroundings, e.g., in the form of a speed indication. This data may be used by the source-based error resiliency module 106 to dynamically apply error resiliency to a source signal or a source-coded signal. For example, at relatively low speeds (e.g., 0-10 MPH), no error resiliency may be added based on the speed indication. At higher speeds (e.g., greater than 10 MPH), error resiliency may be added based on the speed indication to reduce packet loss and maintain voice quality. This type of a prior source-based error resiliency may be more responsive than channel coding because it is based on a locally measured and available speed indication rather than channel feedback in the case of channel coding. Furthermore, the amount of error resiliency may increase as the speed of the wireless communication device 102 increases, i.e., different amounts of source-based error resiliency are applied for different speeds. In one configuration, the amount of error resiliency may increase linearly from a lower speed threshold, below which no error resiliency is applied, to a higher speed threshold, above which a maximum amount of error resiliency is applied. For example, if 10 MPH were the lower speed threshold and 50 MPH were the higher speed threshold, the wireless communication device 102 may apply zero error resiliency at speeds below 10 MPH, maximum error resiliency above 50 MPH, and an amount of error resiliency that is linearly increasing from zero to maximum at speeds between 10 and 50 MPH. Alternatively, the increase in error resiliency applied may increase exponentially between the lower speed threshold and the higher speed threshold. Alternatively, the error resiliency may increase (linearly or exponentially) beginning at 0 MPH up to a higher speed threshold (e.g., 50 MPH).

Following source coding and application of source-based error resiliency (in some configurations, source coding may refer to both operations), the wireless communication device 102 may apply channel coding (e.g., based on a channel estimate), after which the packets may be transmitted to the base station 104. The present systems and methods may be used with any suitable source codec and channel codec. For example, one or more of the following source codecs may be used: Enhanced Variable Rate CODEC (EVRC), EVRC Wideband (EVRC-WB), Enhanced Variable Rate Codec B (EVRC-B), EVRC Narrowband and Wideband combined (EVRC-NW), Adaptive Multi-Rate (AMR), AMR Wideband (AMR-WB), etc.

Figure 2:
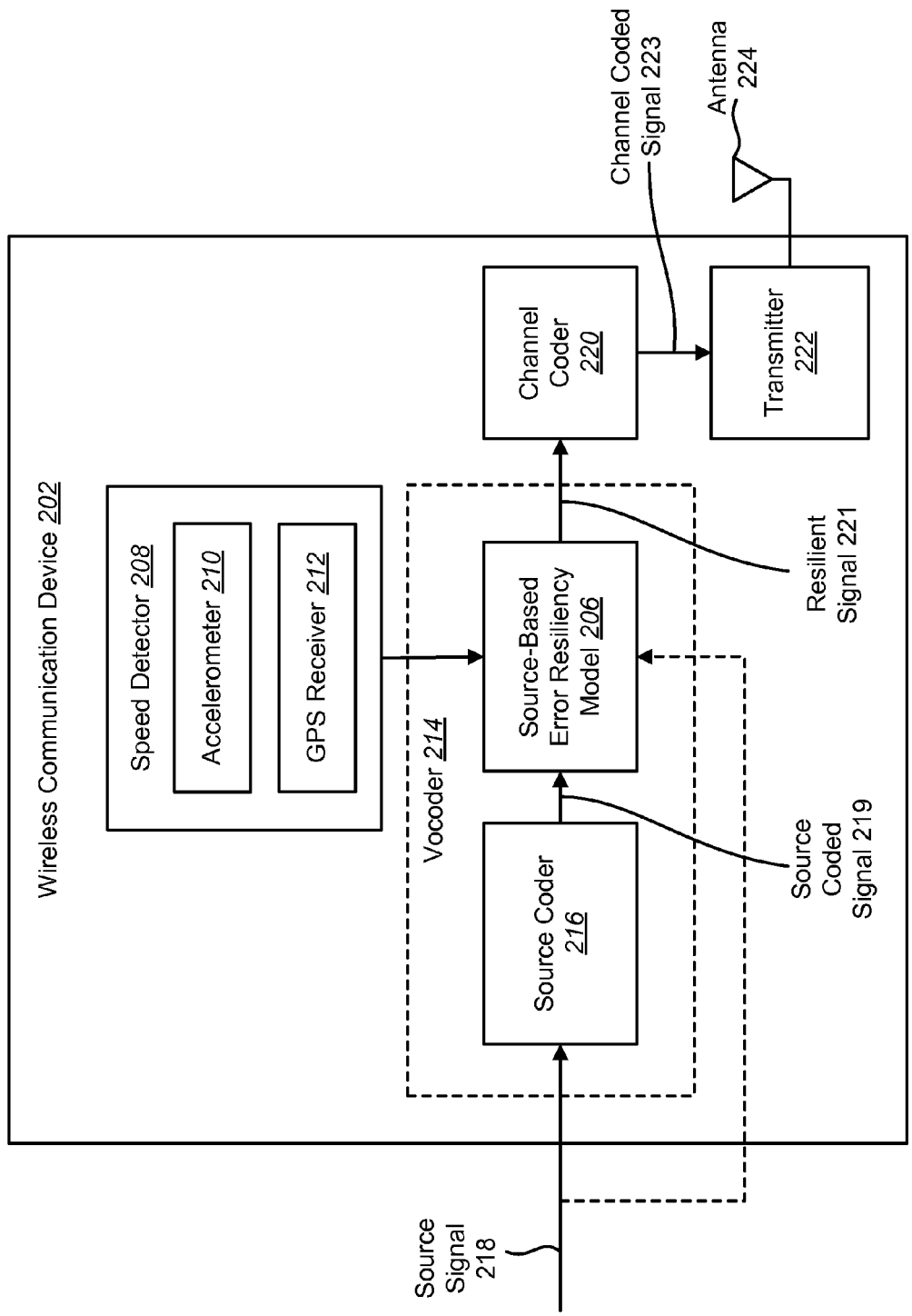
FIG. 2 is a block diagram illustrating a wireless communication device with a vocoder that applies source-based error resiliency to a source signal.

FIG. 2 is a block diagram illustrating a wireless communication device 202 with a vocoder 214 that applies source-based error resiliency to a source signal 218. The source signal 218 may include speech, music, video or any other type of data to be transmitted. In the illustrated configuration, the vocoder 214 is shown as including the source-based error resiliency module 206, however, the source-based error resiliency module 206 may reside outside the vocoder 214. The vocoder 214 may include a source coder 216 that minimizes the bit rate for representing the source signal 218 at the output of the vocoder 214, i.e., the source coder 216 may encode the source signal 218 using fewer bits than the original representation of the source signal 218 using any suitable source codec. In other words, the source coded signal 219 may have fewer bits than the source signal 218. In one configuration, the source-based error resiliency module 206 may reside in the source coder 216, i.e., the source-based error resiliency may be applied as part of the source coding.

A source-based error resiliency module 206 may then dynamically apply source-based error resiliency based on a speed indication from a speed detector 208 to produce a resilient signal 221. This may include applying source-based error resiliency to the source coded signal 219 or the source signal 218 itself, i.e., the source-based error resiliency may be applied before, during or after the source coding. A speed detector 208 may determine a speed indication using an accelerometer 210 or a GPS receiver 212 or both. As previously discussed, dynamic source-based error resiliency may be more responsive than channel coding because source-based error resiliency may rely on a speed indication that is locally determined and available compared to channel coding that may rely on a channel estimate, e.g., determined from channel feedback.

In one configuration, a speed indication may only be used if it is relatively consistent. The wireless communication device 202 may use a comparison threshold and a time threshold to filter outlying speed indications, e.g., if a current speed indication is more than a comparison threshold different than a speed indication received within a time threshold, the current speed indication may not be considered valid and no source-based error resiliency may be applied. For example, if a current speed indication is more than 10 MPH different than a previous speed indication received within the prior 100 ms, the current speed indication may be disregarded and no additional source-based error resiliency is applied.

Furthermore, the source-based error resiliency may also be applied based on the importance of the information being transmitted, e.g., one or more characteristics of the source signal 218 may be used, in addition to the speed indication, to apply error resiliency. For example, speech frames classified as active (e.g., by a voice activity detector (VAD)) may be given more protection (i.e., more redundant bits) than frames classified as transient or inactive. Similarly, transient speech frames may be given more protection than inactive frames.

The resilient signal 221 may be channel coded by a channel coder 220 to increase reliability (e.g., reduce bit error probability) during transmission using any suitable channel codec. The channel coding may include adding redundant data using any suitable technique. For example, some of the techniques used to apply source-based error resiliency may be used in the channel coding. After channel coding, a transmitter 222 may transmit the channel coded signal 223 via one or more antennas 224. The wireless communication device 202 may be operating using a voice over a packet switched protocol, e.g., VoLTE or VoIP.

Figure 3:
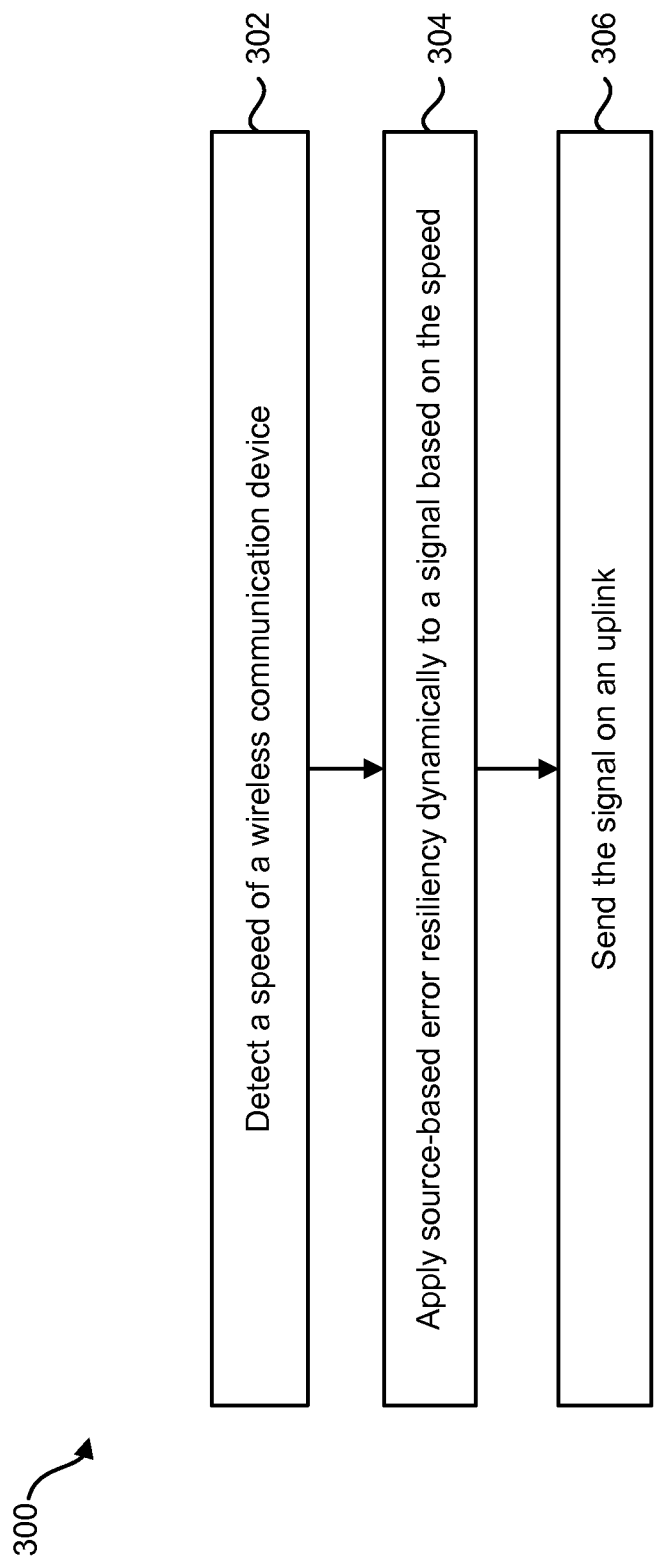
FIG. 3 is a flow diagram illustrating a method for applying source-based error resiliency based on speed.

FIG. 3 is a flow diagram illustrating a method 300 for applying source-based error resiliency based on speed. The method 300 may be implemented by a wireless communication device 202, e.g., in firmware or in a vocoder 214. The wireless communication device 202 may detect 302 a speed of the wireless communication device 202. This may include using an accelerometer 210 or GPS receiver 212. The wireless communication device may also apply 304 source-based error resiliency based on the speed. As discussed previously, source-based error resiliency may take place at a level higher than the physical layer (e.g., in the vocoder) while channel coding may take place on the physical layer. By using a speed indication, the wireless communication device may be able to apply source-based error resiliency before or close to the same time as when the channel degrades due to mobility. In contrast, channel coding may use channel feedback to determine a channel estimate. This may be less responsive than source-based error resiliency because the channel may have already degraded by the time the wireless communication device 202 is able to add extra resiliency bits. The wireless communication device 202 may also send 306 the signal on an uplink. The transmitted signal may be sent using a voice over packet switched protocol, e.g., VoLTE or VoIP.

Figure 4:
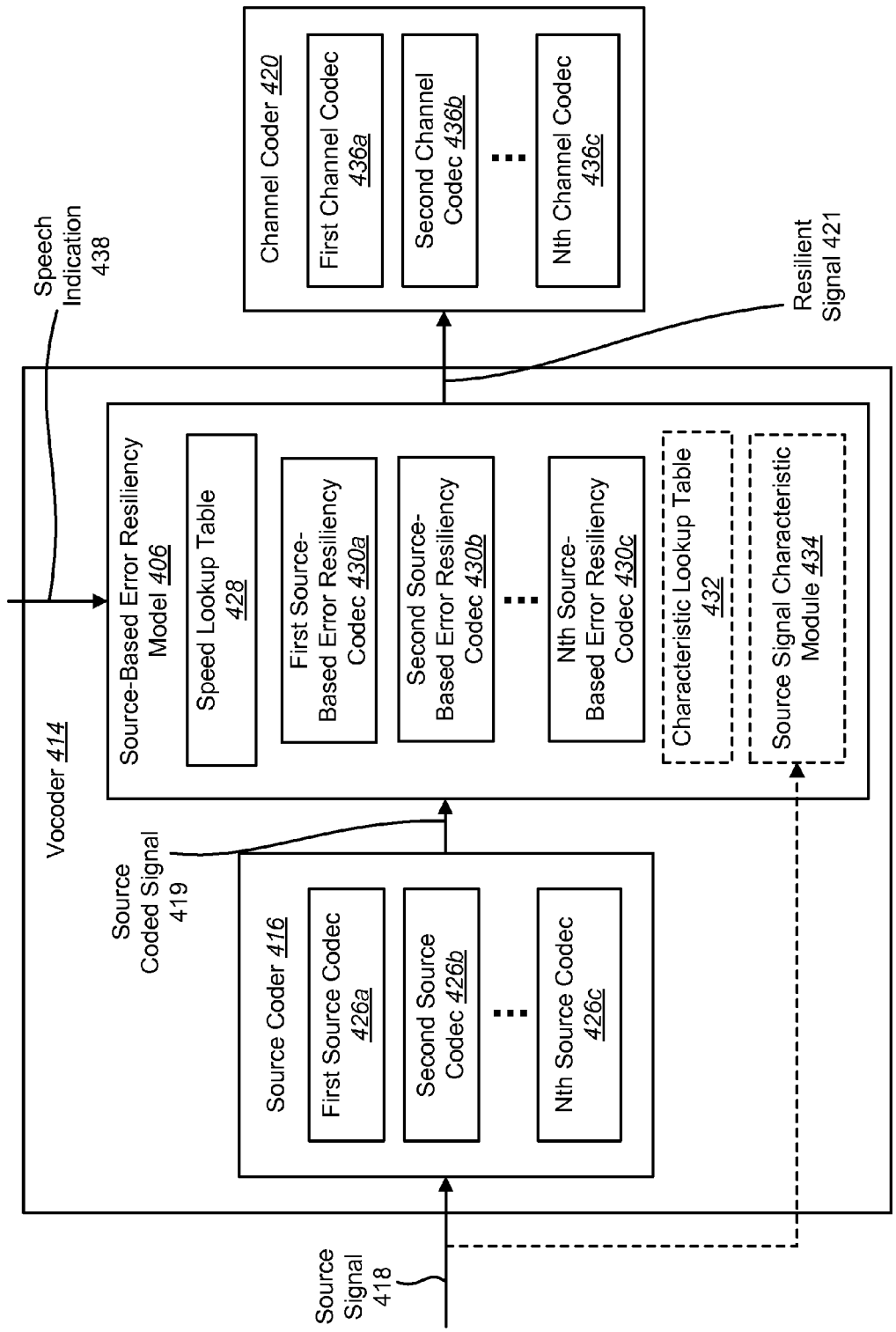
FIG. 4 is a block diagram illustrating one configuration of a vocoder for applying source-based error resiliency.

FIG. 4 is a block diagram illustrating one configuration of a vocoder 414 for applying source-based error resiliency. The vocoder 414 may include a source coder 416 and a source-based error resiliency module 406. The source coder 416 may encode a source signal 418 to produce a source coded signal 419. The source signal 418 may include speech, music, video or any other type of data to be transmitted. In one configuration, the source coder 416 may include multiple source codecs 426a-c that each code source signals 418 in a different way. For example, the first source codec 426a may be an Adaptive Multi-Rate (AMR) codec, a second source codec 426b may be an AMR Wideband (AMR-WB) codec and an Nth source codec 426c may be an Extended AMR-WB (AMR-WB+) codec. Therefore, the source-based error resiliency module 406 may be compatible with many different types of source codecs 426a-c.

The source-based error resiliency module 406 may receive a speed indication 438, e.g., from a speed detector 208. One of multiple source-based error resiliency coders 430a-c may dynamically apply source-based error resiliency to the source-coded source signal based on the speed indication 438. For example, more protection may be applied (e.g., more redundant bits sent) when the speed indication 438 is relatively high. Alternatively, little or no protection may be applied when the speed indication 438 is relatively low. In one configuration, no error protection may be applied for speed indications 438 below a particular lower speed threshold (e.g., 8, 10, 12 MPH) and maximum error protection may be applied for speed indications 438 above a higher speed threshold (e.g., 40, 50, 60 MPH). Alternatively, the source-based error resiliency module 406 may reside in the source coder 416, i.e., the source-based error resiliency may be added as part of the source coding.

Upon receiving a speed indication 438, the source-based error resiliency module 406 may determine an amount of error protection to apply. This may include using a speed lookup table 428 that has a corresponding error resiliency for each speed or speed range that might be indicated by the speed indication 438. For example, the speed lookup table 428 may indicate that for speed indications 438 less than 10 MPH, no error resiliency be applied; for speed indications 438 between 10 MPH and 20 MPH, a first amount of error protection be applied; for speed indications 438 between 20 MPH and 30 MPH, a second amount of error protection be applied, etc.

Furthermore, in one configuration, source-based error resiliency may be speed-dependent and source-dependent, i.e., source-based error resiliency may be applied based on the importance or characteristics of the information being transmitted and the speed 438 of the wireless communication device 202. Characteristic(s) of the source signal 418 (or alternatively the source-coded source signal) may be determined by a source signal characteristic module 434. For example, high energy voice segments may be given more error resiliency than low energy voice segments. Alternatively, active speech segments may be given more protection than transient speech segments, which may be given more protection than inactive segments. Alternatively, a rate used by a particular multi-rate source codec 426*a-c* may be used to apply source-based error resiliency. For example, full-rate packets may be given maximum protection, half-rate packets may be given less protection and fourth- and eighth-rate packets may be given even less or zero protection. Alternatively, energy within different frequency bands may be used to apply source-based error resiliency. For example, voice segments with high energy in frequency bands typically in the voice spectrum may be given more protection than voice segments with low energy in those frequency bands.

In configurations in which a characteristic of the source signal 418 (or the source-coded source signal) is used to apply source-based error resiliency, a characteristic lookup table 432 may be used that has a corresponding error resiliency for each value or range of values that might be indicated by the source signal characteristic module 434. For example, below a lower characteristic threshold, little or no error protection may be applied, between a lower characteristic threshold and a higher characteristic threshold error protection may be applied in a linearly (or exponentially) increasing manner, and a maximum amount of error protection may be applied above the higher characteristic threshold. In one configuration, the speed lookup table 428 and the characteristic lookup table 432 may be combined into a single lookup table (not shown). For example, a combined table may have a corresponding error protection for each combination of a speed indication 438 and source signal characteristic.

The output of the vocoder 414 (i.e., the resilient signal 421) may be channel coded by a channel coder 420. The channel coder 420 may include channel codecs 436*a-c* that sends redundant bits on the physical layer based on a channel estimate. The channel estimate may be determined from channel feedback, e.g., a signal-to-noise ratio from a base station. For example, more protection may be applied (e.g., more redundant bits sent) by one of the channel codecs 436*a-c* when the channel quality is poor. Alternatively, less error protection may be applied when the channel quality is high. The channel coded signal may be wirelessly transmitted to a base station. This may include using any channel access method or transmission protocol, CDMA, TDMA, HSPA, CDMA2000, HSPA, VoIP, VoLTE, etc.

Figure 5:
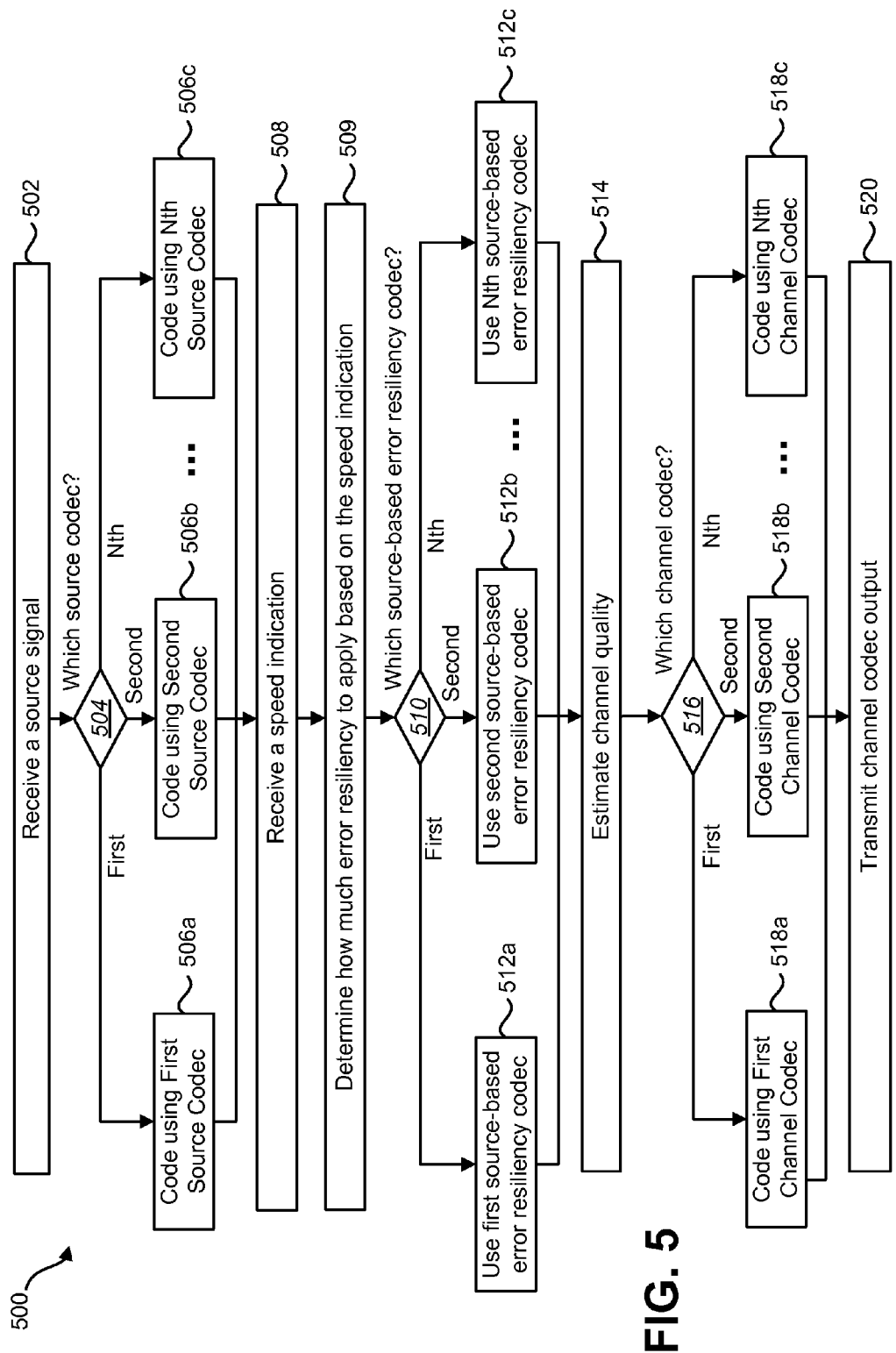
FIG. 5 is a flow diagram illustrating a method for applying source-based error resiliency based on speed of a wireless communication device.

FIG. 5 is a flow diagram illustrating a method 500 for applying source-based error resiliency based on speed of a wireless communication device 202. The method 500 may be performed by a wireless communication device 202. The wireless communication device 202 may receive 502 a source signal and determine 504 which source codec to use. The wireless communication device 202 may also code 506*a-c* the source signal 218 using the selected codec. For example, the wireless communication device 202 may include N source codecs, e.g., a first source codec 426*a* may be an Adaptive Multi-Rate (AMR) codec, a second source codec 426*b* may be an AMR Wideband (AMR-WB) codec and an Nth source codec 426*c* may be an EVRC-NW codec. Alternatively, any number or configuration of suitable source codecs 426*a-c* may be used.

The wireless communication device 202 may also receive 508 a speed indication. In one configuration, the wireless communication device 202 may also determine 509 how much error resiliency to apply based on the speed indication. The wireless communication device 202 may also determine 510 which source-based error resiliency codec to use and use 512*a-c* the selected source-based error resiliency codec to apply the determined amount of error resiliency to the source signal (or the source-coded bits).

The wireless communication device 202 may also estimate 514 a channel quality, e.g., based on channel feedback. The wireless communication device 202 may also determine 516 which channel codec to use and code 518*a-c* the signal, i.e., add redundant bits to the signal. The wireless communication device 202 may also transmit 520 the output of the channel codec.

FIG. 6 is a diagram illustrating a speed lookup table 628. The speed lookup table 628 may reside in a wireless communication device 402 and may associate a speed 638 or range of speeds 638 with an amount of error resiliency 642. For example, between 10-20 MPH, an amount A 642 of error resiliency may be used. Similarly, between 20-30, 30-40 and 40-50, amounts B, C and D of error resiliency may be applied, respectively. Furthermore, below 10 MPH and above 50 MPH, zero and maximum (E) amounts 642 of error protection may be applied.

FIG. 7 is a block diagram illustrating a combined lookup table 700. The combined lookup table 700 may be used to dynamically apply source-based error resiliency based on speed 738 and a signal characteristic 746 (or source coded signal). For example, for a signal characteristic 746 with a value between X and Y in a wireless communication device with a speed 738 between 10 MPH and 30 MPH, the amount of source-based error resiliency that is applied may be A. Alternatively, for a signal characteristic 746 with a value between X and Y in a wireless communication device with a speed 738 between 30 MPH and 50 MPH, the amount of source-based error resiliency that is applied may be B. Alternatively, for a signal characteristic 746 with a value between Y and Z in a wireless communication device with a speed 738 between 10 MPH and 30 MPH, the amount of source-based error resiliency that is applied may be D.

Therefore, the combined lookup table may include an amount of source-based error resiliency that corresponds to a combination of speed 738 and signal characteristic 746. Any suitable signal characteristic 746 may be used, e.g., voice segment energy, voice segment energy within a frequency band, voice segment classification (active, transient, inactive), segment rate used by a source codec (full, half, quarter, eighth), etc. Additionally, the "amount" of error resiliency to be applied may be indicated in any suitable way, e.g., as a percentage of the maximum possible error resiliency or according to preset levels.

Figure 8:
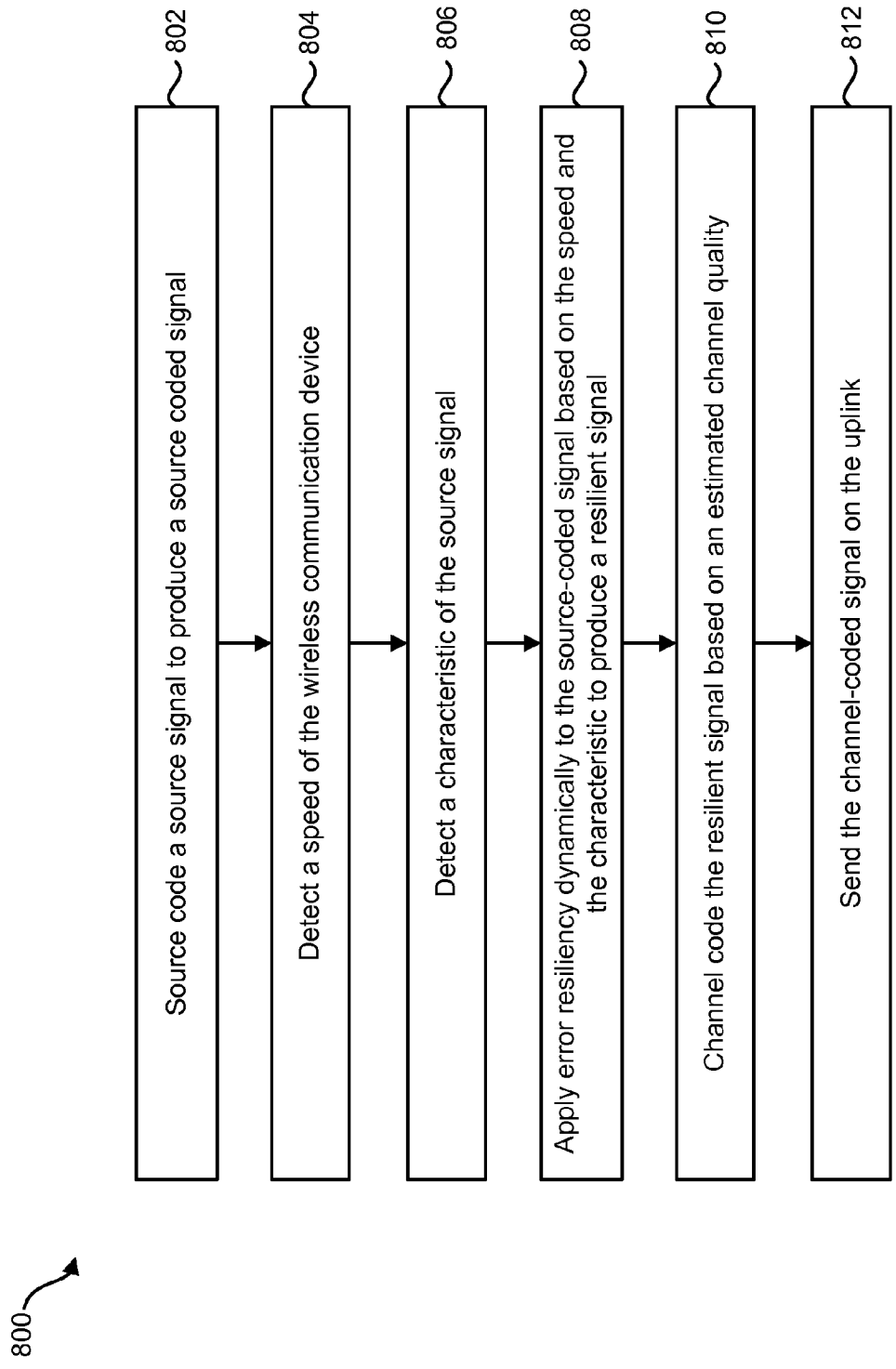
FIG. 8 is a flow diagram illustrating a method for applying source-based error resiliency based on speed of a wireless communication device and one or more characteristics of a source signal (or source coded signal)

FIG. 8 is a flow diagram illustrating a method 800 for applying source-based error resiliency based on speed of a wireless communication device 202 and one or more characteristics of a source signal (or source coded signal). The method 800 may be implemented by a wireless communication device 202. The wireless communication device 202 may source code 802 a source signal 218 to produce a source coded signal 219. This may include using one of multiple source codecs to reduce the number of bits in the source signal 218 compared to the original representation. Alternatively, there may only be a single source codec with which to source code the source signal 218.

The wireless communication device 202 may also detect 804 a speed of the wireless communication device 202, e.g., using an accelerometer 210 or GPS receiver 212. The wireless communication device 202 may also detect 806 a characteristic of the source signal 218. Alternatively, the characteristic(s) may be determined based on the source coded signal 219. The wireless communication device may also apply 808 error resiliency dynamically to the source-coded signal (or the source signal 218 itself) based on the speed and the characteristic to produce a resilient signal 221. The resilient signal 221 may be more responsive than channel coding because it relies, at least in part, on a speed indication rather than channel feedback.

The wireless communication device 202 may also channel code 810 the resilient signal based on an estimated channel quality to produce a channel coded signal 223. The channel quality may be estimated based on channel feedback from a base station, e.g., a received SNR value. The wireless communication device 202 may also send 812 the channel coded signal 223 on the uplink. This may include using any channel access method or transmission protocol, CDMA, TDMA, HSPA, CDMA2000, HSPA, VoIP, VoLTE, etc.

Figure 9:
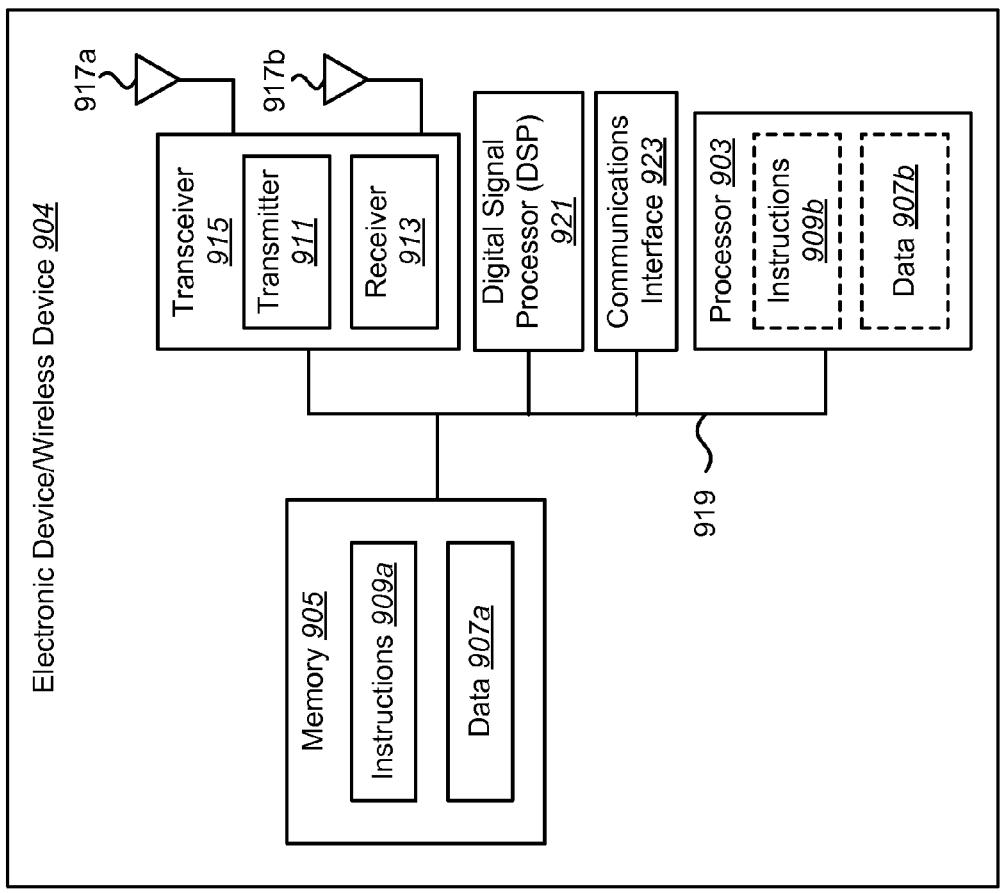
FIG. 9 illustrates certain components that may be included within an electronic device/wireless device.

FIG. 9 illustrates certain components that may be included within an electronic device/wireless device 904. The electronic device/wireless device 904 may be an access terminal, a mobile station, a user equipment (UE), a base station, an access point, a broadcast transmitter, a node B, an evolved node B, etc., such as the wireless communication device 102 illustrated in FIG. 1. The electronic device/wireless device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the electronic device/wireless device 904 of FIG. 9, in an alternative configuration, a combination of processors (e.g., an ARM and DSP) could be used.

The electronic device/wireless device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The electronic device/wireless device 904 may also include a transmitter 911 and a receiver 913 to allow transmission and reception of signals to and from the electronic device/wireless device 904. The transmitter 911 and receiver 913 may be collectively referred to as a transceiver 915. Multiple antennas 917a-b may be electrically coupled to the transceiver 915. The electronic device/wireless device 904 may also include (not shown) multiple transmitters, multiple receivers, multiple transceivers and/or additional antennas.

The electronic device/wireless device 904 may include a digital signal processor (DSP) 921. The electronic device/wireless device 904 may also include a communications interface 923. The communications interface 923 may allow a user to interact with the electronic device/wireless device 904.

The various components of the electronic device/wireless device 904 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE- PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 5 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for applying error resiliency based on speed, the method being performed by a wireless communication device, the method comprising:
   detecting a speed of movement of the wireless communication device;
   applying, in a vocoder of the wireless communication device, source-based error resiliency dynamically to an uplink signal based on the locally-detected speed of movement of the wireless communication device to produce a resilient signal, wherein the speed of movement is detected within the wireless communication device that applies the source-based error resiliency to the uplink signal; and
   sending the resilient signal according to an air interface standard.

2. The method of claim 1, wherein the applying comprises applying source-based error resiliency dynamically to the uplink signal based on the speed and a characteristic of information being transmitted in the uplink signal.

3. The method of claim 1, wherein the uplink signal is a source signal.

4. The method of claim 3, wherein the source signal comprises one of the group consisting of: a data packet, a speech signal, a music signal and a video signal.

5. The method of claim 1, wherein the resilient signal is sent over a packet switched network.

6. The method of claim 1, wherein the resilient signal is sent using a voice over packet switched protocol.

7. The method of claim 1, wherein detecting the speed is based on accelerometer data.

8. The method of claim 1, wherein detecting the speed is based on Global Positioning System (GPS) data.

9. The method of claim 1, wherein applying source-based error resiliency comprises applying at least one of the group consisting of: frame repetition, block coding, convolutional coding, low-density parity check (LDPC) coding, turbo coding, Reed-Solomon coding, Golay coding, BCH coding, multidimensional parity check coding, Hamming coding and Cyclic Redundancy Check (CRC) coding.

10. The method of claim 1, wherein high energy voice segments are given more error resiliency than low energy voice segments.

11. The method of claim 1, wherein the uplink signal is a source signal or a source-coded signal.

12. The method of claim 1, wherein the source-based error resiliency is applied before, during or after source coding.

13. A wireless communication device for applying error resiliency based on speed comprising:
   a processor
   configured to:
      detect a speed of movement of the wireless communication device;
      apply, in a vocoder of the wireless communication device, source-based error resiliency dynamically to an uplink signal based on the locally-detected speed based on the speed of movement of the wireless communication device to produce a resilient signal, wherein the speed of movement is detected within the wireless communication device that applies the source-based error resiliency to the uplink signal; and
      send the resilient signal according to an air interface standard.

14. The wireless communication device of claim 13, wherein the applying comprises applying source-based error resiliency dynamically to the uplink signal based on the speed and a characteristic of information being transmitted in the uplink signal.

15. The wireless communication device of claim 13, wherein the uplink signal is a source signal.

16. The wireless communication device of claim 15, wherein the source signal comprises one of the group consisting of: a data packet, a speech signal, a music signal and a video signal.

17. The wireless communication device of claim 13, wherein the sending comprises sending the resilient signal over a packet switched network.

18. The wireless communication device of claim 13, wherein the sending comprises sending the resilient signal using a voice over packet switched protocol.

19. The wireless communication device of claim 13, wherein the detecting the speed comprises detecting the speed based on accelerometer data.

20. The wireless communication device of claim 13, wherein the detecting the speed comprises detecting the speed based on Global Positioning System (GPS) data.

21. The wireless communication device of claim 13, wherein the applying source-based error resiliency comprises applying at least one of the group consisting of: frame repetition, block coding, convolutional coding, low-density parity check (LDPC) coding, turbo coding, Reed- Solomon coding, Golay coding, BCH coding, multidimensional parity check coding, Hamming coding and Cyclic Redundancy Check (CRC) coding.

22. A wireless communication device for applying error resiliency based on speed, comprising:
means for detecting a speed of movement of the wireless communication device;
means for applying, in a vocoder of the wireless communication device, source-based error resiliency dynamically to an uplink signal based on the locally-detected speed of movement of the wireless communication device to produce a resilient signal, wherein the speed of movement is detected within the wireless communication device that applies the source-based error resiliency to the uplink signal; and
means for sending the resilient signal according to an air interface standard.

23. The wireless communication device of claim 22, wherein the means for applying comprise means for applying source-based error resiliency dynamically to the uplink signal based on the speed and a characteristic of information being transmitted in the uplink signal.

24. The wireless communication device of claim 22, wherein the uplink signal is a source signal.

25. The wireless communication device of claim 24, wherein the source signal comprises one of the group consisting of: a data packet, a speech signal, a music signal and a video signal.

26. The wireless communication device of claim 22, wherein the means for applying comprise means for applying at least one of the group consisting of: frame repetition, block coding, convolutional coding, low-density parity check (LDPC) coding, turbo coding, Reed-Solomon coding, Golay coding, BCH coding, multidimensional parity check coding, Hamming coding and Cyclic Redundancy Check (CRC) coding.

27. A computer-program product for applying error resiliency based on speed, comprising a non-transitory computer-readable medium having instructions thereon, the instructions comprising:
code for causing a wireless communication device to detect a speed of movement of the wireless communication device;
code for causing the wireless communication device, using a vocoder, to apply source-based error resiliency dynamically to an uplink signal based on the locally-detected speed of movement of the wireless communication device to produce a resilient signal, wherein the speed of movement is detected within the wireless communication device that applies the source-based error resiliency to the uplink signal; and
code for causing the wireless communication device to send the resilient signal according to an air interface standard.

28. The computer-program product of claim 27, wherein the code for causing the wireless communication device to apply comprises code for causing the wireless communication device to apply source-based error resiliency dynamically to the uplink signal based on the speed and a characteristic of information being transmitted in the uplink signal.

29. The computer-program product of claim 27, wherein the uplink signal is a source signal.

30. The computer-program product of claim 29, wherein the source signal comprises one of the group consisting of: a data packet, a speech signal, a music signal and a video signal.

31. The computer-program product of claim 27, wherein the code for causing the wireless communication device to apply source-based error resiliency comprises code for causing the wireless communication device to apply at least one of the group consisting of: frame repetition, block coding, convolutional coding, low-density parity check (LDPC) coding, turbo coding, Reed-Solomon coding, Golay coding, BCH coding, multidimensional parity check coding, Hamming coding and Cyclic Redundancy Check (CRC) coding.

* * * * *